US012129828B2

(12) United States Patent
Schulten

(10) Patent No.: US 12,129,828 B2
(45) Date of Patent: Oct. 29, 2024

(54) METHOD FOR OPERATING A WIND TURBINE, AND A POWER PLANT

(71) Applicant: General Electric Renovables Espana, S.L., Barcelona (ES)

(72) Inventor: Christoph Schulten, Salzbergen (DE)

(73) Assignee: General Electric Renovables España S.L., Barcelona (ES)

( * ) Notice: Subject to any disclaimer, the term of this patent is extended or adjusted under 35 U.S.C. 154(b) by 356 days.

(21) Appl. No.: 17/741,745

(22) Filed: May 11, 2022

(65) Prior Publication Data

US 2022/0364544 A1    Nov. 17, 2022

(30) Foreign Application Priority Data

May 12, 2021   (EP) ..................................... 21173690

(51) Int. Cl.
*F03D 7/04*    (2006.01)
*F03D 7/02*    (2006.01)

(52) U.S. Cl.
CPC ........... *F03D 7/042* (2013.01); *F03D 7/0272* (2013.01); *F05B 2270/20* (2013.01); *F05B 2270/327* (2013.01)

(58) Field of Classification Search
CPC .... G05B 15/02; G05B 23/0291; Y02B 10/30; Y02E 10/72; H02J 3/381; H02J 2300/28
See application file for complete search history.

(56) References Cited

U.S. PATENT DOCUMENTS

| 8,946,916 | B2 | 2/2015 | Tarnowski | |
| 2012/0161444 | A1* | 6/2012 | Tarnowski | .............. H02P 9/107 290/44 |

(Continued)

FOREIGN PATENT DOCUMENTS

| EP | 2532888 B1 | 5/2014 |
| WO | WO2011000531 A2 | 1/2011 |

(Continued)

OTHER PUBLICATIONS

IVariable speed wind turbines capability for temporary overproduction, EEE XploreIEEE Conferences2009-07-0142009 IEEE Power & Energy Society General Meeting (2009, pp. 1-7) (Year: 2009).*

(Continued)

*Primary Examiner* — Darrin D Dunn
(74) *Attorney, Agent, or Firm* — Dority & Manning, P.A.

(57) ABSTRACT

A method (2000) for operating a wind turbine (100) including a rotor (106) having rotor blades (108) and a power conversion system (118, 210, 234) mechanically connected with the rotor (106), configured to convert input motive power into electrical output power, and electrically connected to a network (242) for feeding the electrical output power (P) to the network is provided. The method includes initializing (2000), at a first time ($t_0$), the wind turbine to operate in an overproduction operating mode in which the electrical output power (P(t)) of the power conversion system is increased from an initial electrical output power of the power conversion system by providing kinetic energy stored in the rotor. At a second time ($t_2$), decreasing (2200) the electrical output power, and integrating a reference power ($P_{ref}$, $P_0$) to determine an energy recovery value ($E_{rec}$) are started. An energy response value ($E_{resp}$) corresponding to a product of the reference power ($P_{ref}$) with a time difference ($T_{resp}$) between the second time and the first time is determined (2300). The wind turbine is operated (2400) in a recovery operating mode from a third time ($t_3$) at which the electrical output power (P) reaches or crosses the reference power ($P_{ref}$, $P_0$) until the energy recovery value becomes at least equal to the energy response value or until the electrical output power reaches or crosses the reference power again from below. In the recovery operating mode, the electrical output power is, limited upwards depending on the reference (Continued)

power and a currently available maximum electrical power output without reducing a speed of the rotor.

15 Claims, 5 Drawing Sheets

(56) References Cited

U.S. PATENT DOCUMENTS

| | | |
|---|---|---|
| 2016/0160839 A1 | 6/2016 | Wang |
| 2020/0063712 A1 | 2/2020 | Green |
| 2021/0006068 A1* | 1/2021 | Gupta .................. H02J 3/0012 |
| 2023/0075813 A1* | 3/2023 | Hawkins .............. F03D 7/0204 |
| 2023/0198263 A1* | 6/2023 | Yu ........................ F03D 7/0276 |
| | | 700/287 |

FOREIGN PATENT DOCUMENTS

| | | |
|---|---|---|
| WO | WO2016206698 A1 | 12/2016 |
| WO | WO2017059862 A1 | 4/2017 |

OTHER PUBLICATIONS

Analysis of the short-term overproduction capability of variable speed wind turbines Hansen, Anca Daniela; Altin, Müfit; Margaris, Ioannis D. ; Iov, Florin; Tarnowski, Germán C. (Year: 2014).*
European Search Report Corresponding to EP21173690 on Nov. 15, 2021.
Tarnowski et al., Variable Speed Wind Turbines Capability for Temporary Over-Production, 2009 IEEE Power & Energy Society General Meeting, 2009, 7 Pages. https://ieeexplore.ieee.org/document/5275387.

* cited by examiner

METHOD FOR OPERATING A WIND TURBINE, AND A POWER PLANT

FIELD

The present subject matter relates generally to operating wind turbines, and more particularly to operating wind turbines in accordance with grid code requirements, and to corresponding power plants, in particular wind power plants.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid often also referred to as (supply) network.

With the often-desired increasing share of renewable energy sources such as wind farms and solar farms in electric power generation, which rely on not controllable power sources ("wind" and "sun"), compliance with grid requirements becomes more important. This particularly refers to imbalances between the electrical power fed into a grid and the electrical power withdrawn from it by consumers as this may result in fluctuations of the grid frequency. For example, the grid frequency drops when the power consumption exceeds electrical power fed into the grid. For stability reasons, fluctuations of the grid frequency around a desired or target grid frequency of e.g. 50 Hz for Central European grids and 60 Hz for US grids are to be kept within certain limits of at most a few percent. Accordingly, grid operators typically specify primary power control requirements for the electric power generation plants in so-called grid codes which may change over time and typically also depend on the region and country, respectively.

Kinetic energy that is or may additionally be stored in rotating parts of electric power generation plants such as a rotor of a wind turbine may be used as a power reserve that can be used for (partly) compensating a deviation of the grid frequency, by de-accelerating and accelerating the rotor. However, de-accelerating (accelerating) the rotor to too low (high) rotor speed is to be avoided.

Accordingly, the present disclosure provides a method for operating a wind turbine according to claim 1, a power plant according to claim 10, and a computer program product or a computer-readable storage medium according to claim 15.

BRIEF DESCRIPTION

Aspects and advantages of the invention will be set forth in part in the following description, or may be obvious from the description, or may be learned through practice of the invention.

In one aspect, the present disclosure is directed to a method for operating a wind turbine. The wind turbine includes a rotor having rotor blades, and a power conversion system mechanically connected with the rotor, configured to convert input motive power into electrical output power, and electrically connected to a network for feeding the electrical output power to the network. The network is typically a utility grid. The method includes initializing, at a first time, the wind turbine to operate in an overproduction operating mode in which the electrical output power of the power conversion system is increased from an initial electrical output power of the power conversion system (at the first time), wherein kinetic energy stored in the rotor is used, for example if the wind speed does not increase (on average) reduced in the overproduction mode. Decreasing the electrical output power and integrating a reference power typically related to the initial electrical output power to determine an energy recovery value is started at a second time. An energy response value corresponding to a product of the reference power with a time difference between the second time and the first time is determined. The wind turbine is operated in a recovery operating mode from a third time at which the electrical output power reaches and/or crosses the reference power (from above) until the energy recovery value becomes at least equal to the energy response value or until the electrical output power reaches and/or crosses the reference power again from below. In the recovery operating mode, the electrical output power is limited upwards depending on the reference power and a currently available maximum electrical power output without reducing a speed of the rotor.

Accordingly, wind turbines that may have large rotatable masses and correspondingly large moments of inertia, respectively, and can store considerably amounts of kinetic energy, and/or wind power plants or hybrid power plants having several, typically a plurality of wind turbines may both quickly and efficiently contribute to stabilizing the grid frequency during an underfrequency event without damaging the wind turbine(s) when operated in overproduction operating mode, and recover thereafter so that the grid is likely to remain stable, typically in accordance with a grid code. This is confirmed by simulations (not shown).

More particular, typically country/region-dependent grid code requirements for fast frequency response during an underfrequency event such as power increase and thereafter (power recovery requirements) such as reaching power within a certain time limit of e.g. 180 s can be flexibly met. This is in particular because the electrical output power is, in the recovery operating mode, limited upwards.

Note that the increased electrical output power of the power conversion system in the overproduction mode is provided by/converted from the kinetic energy stored in the power conversion system.

Typically, at least one of, more typically both of a rotational energy stored in a moment of inertia of the rotor, and a rotational energy stored in a moment of inertia of a generator rotor of a generator of the power conversion system is used to provide the electrical output power increase.

The reference power is typically related to the initial electrical output power. The reference power may even correspond to the initial electrical output power.

However, the reference power may also be a different predetermined power level. For given or predetermined timing of the overproduction operating mode, in particular in accordance with a grid code, energy response value may even be an accordingly predetermined value. In this embodiment, the energy response value may be determined in advance and retrieved, e.g. from a look-up table storing the predetermined energy response value and optionally other predetermined values related to the overproduction mode (times, time intervals, and or rates as explained below).

The first time is typically a time at which the actual or current frequency of the network is determined to be equal to or lower than the threshold frequency or a time shortly thereafter, i.e. within real time, i.e. with a maximum delay of at most about 0.5 s or 0.2 s, or in near real-time, i.e. with a maximum delay of at most about 5 s or even less than 2 s and at the next possible time of the control, respectively.

Note that the (actual) electrical output power of the power conversion system may (at least substantially) reach or cross the reference power depending on a used (controller) cycle time. Typically, a change of operating the wind turbine will be caused (occur) after the (actual) electrical output power of the power conversion system has crossed the reference power.

The threshold frequency may be lower than a target frequency of the network. At least one of, typically both the threshold frequency and the target frequency are predetermined and/or configurable values, in particular in accordance with a grid code. For example, the threshold frequency may correspond to a deadband frequency of the network as specified in an applicable grid code.

Note further, that a time difference between the second time and the first time may be specified by the applicable grid code.

Typically, the electrical output power is, in the recovery operating mode, limited (and therefore typically also determined) as a function of the reference power, the currently available maximum electrical power output, and a power factor, more typically by a minimum of the reference power and the currently available maximum electrical power output times the power factor. Accordingly, controlling may be facilitated.

The power factor is typically larger than zero and at most equal to 1, typically in a range from about 0.9 to 1, for example in a range from about 0.91 to about 0.99.

Further, determining the currently available maximum electrical power output may be at least in part be based on a typically measured rotor speed.

The reference power may e.g. be determined by summing up the reference power times a cycle time.

Typically, operating the wind turbine and its power conversion system, respectively, in the overproduction operating mode is only initialized, in particular by a power plant controller (e.g. a wind farm controller) supervising the turbine controller(s), when a current or actual frequency of the network (utility grid) is equal to or lower than a threshold frequency, in particular a deadband frequency of the utility grid. Within this specification the term "power plant" shall embrace the term "power conversion plant", "wind farm", "wind power plant" and "hybrid power plant".

For example, the power plant controller may send an inertia flag or inertia command to one, several or even all wind turbine controllers of the power plant. In response, the wind turbine controller(s) may start operating (and operate thereafter) the respective power conversion system in the overproduction operating mode.

In the overproduction operating mode, that may be controlled by the turbine controller(s), the electrical output power may be ramped up to a higher but typically curtailed value lower than a maximum possible electrical output power at the first time, typically to a configurable fraction or percentage of the maximum possible electrical output power at the first time, more typically to a respective value in accordance with an applicable grid code.

Thereafter, the electrical output power may be kept at least substantially constant. When a typically configurable predefined and/or grid code specific response time interval of e.g. to 10 s to 14 s is reached, the power plant controller may start integrating the reference power, and the wind turbine controllers may start ramping down the electrical output power of the wind turbine(s).

Ramping-up and ramping-down the electrical output power during the overproduction operating mode may be performed in accordance with predetermined and/or configurable respective rates and/or with respective up and down times, in particular as specified in an applicable grid code.

In other words, in the overproduction operating mode, the wind turbine and its power conversion system, respectively, may be operated in accordance with a predetermined and/or configurable piecewise linear function of time, in particular as requested by the applicable grid code.

Further, several or even all wind turbines are typically operated substantially synchronous during the overproduction operating mode, in particular in accordance with the same response time interval (same time difference between the second time and the first time), the same up and down rates and/or with the same up and down times (same time difference between the third time and the first time).

Accordingly, the wind turbines of a power plant (are expected to) reach or cross the respective reference power at the same time (third time).

In other words, a plurality of wind turbines may be operated at least substantially synchronous from the first time to the second time, i.e. within the overproduction mode, more typically from the first time to the third time, i.e. within an inertia operation mode of the overproduction mode and a subsequent transition operating mode (from the second time to the third time) of reducing the power output in which additional power is provided by (reducing) kinetic energy stored in the wind turbine, in particular its rotor and power conversion system.

At the third time, the plant controller may send a recovery flag or recovery command to the turbine controllers.

In response, the turbine controllers may start operating the wind turbines in the recovery operating mode.

For this purpose each turbine controller may limit the electrical output power of the respective power conversion system to an upper value depending on the respective reference power and a respective currently available maximum electrical power output without reducing the rotor speed.

When the electrical output power reaches and/or crosses the reference power again from below, the turbine controller may reset the recovery flag from e.g. true or one to false or zero again. Alternatively (or in addition), the recovery flag is reset if the energy recovery value becomes at least equal to the energy response value, in particular in response to receiving a respective command from the plant controller.

In this way, the respective grid requirements can be particularly easy and flexible implemented.

In one aspect, the present disclosure is directed to power conversion plant connectable to a network, in particular a utility grid, in particular a respective renewable power conversion plant. The power conversion plant includes a wind turbine including a rotor and a power conversion system mechanically connected with the rotor, electrically connectable to the network, and configured to convert input motive power into electrical output power, and a control system communicatively couple with the power conversion system. The control system is configured to operate the wind turbine between a first time and a second time in an overproduction operating mode. In the overproduction mode, the electrical output power of the power conversion system is increased from an initial electrical output power of the power conversion system at the first time by using kinetic energy stored in the rotor, and typically by using kinetic energy stored in the power conversion system. The control system is further configured to determine an energy response value corresponding to a product of a reference power typically related to the initial electrical output power with a time difference between the second time and the first time, to start, at the second time, decreasing the electrical output power and integrating the reference power to determine an energy recovery value, and to operate, when the electrical output power reaches the reference power again, the wind turbine in a recovery operating mode until the energy recovery value becomes at least equal to the energy response value or until the electrical output power reaches or crosses the reference power again from below. In the recovery operating mode, the electrical output power is, limited upwards depending on the reference power and a currently available maximum electrical power output without (further) reducing a speed of the rotor.

The power conversion plant further includes a sensor communicatively coupled with the control system, and connectable to the network for measuring at least one signal which is at least correlated with a frequency of the network.

The at least one signal may (directly) correspond to the current frequency of the network. In other words, the sensor may include or be a frequency sensor.

The control system is typically configured to initialize operating the wind turbine in the overproduction operating mode when the current frequency of the network is equal to or lower than a threshold frequency as described herein.

The power conversion plant may in particular be a wind farm and/or include at least two wind turbines, more typically a plurality of wind turbines. Each of the wind turbines may have a respective wind turbine controller.

Typically, the control system includes a supervisory controller (plant controller) communicatively coupled with the wind turbine controllers, for example a a wind farm controller.

The supervisory controller may be configured to supervise the wind turbine controllers, to instruct the wind turbine controllers to operate the respective wind turbine in the overproduction operating mode, to determine the energy response value, to determine the energy recovery value, to compare the energy response value and the energy recovery value, and/or send commands to the wind turbine controllers.

In particular, the supervisory controller may be configured to instruct the wind turbine controllers to operate the respective wind turbines at least substantially synchronously in the overproduction operating mode or even in the complete inertia operating mode.

The supervisory controller or more typically the wind turbine controllers may be configured to determine and/or monitor the currently available maximum electrical power output for the wind turbines, and/or to operate the wind turbines, in particular depending on the respective currently available maximum electrical power output.

Further, the control system is typically configured to control the respective power conversion system so that a power increase between the first time and the second time is provided using rotational energy stored in a moment of inertia of the rotor and/or a generator rotor of a generator of the respective power conversion system. For example, the controller system may determine and use respective power setpoints for controlling a converter of the power conversion system.

Further, the control system may be configured to perform the any of the method steps as explained herein.

The terms "control system" and "controller" as used herein shall embrace two or more controllers which are functionally coupled with each other.

In one aspect, the present disclosure is directed to a computer program product or a computer-readable storage medium. The computer program product or the computer-readable storage medium includes instructions which, when executed by a one or more processors of a system, in particular a controller of the power conversion plant as explained herein, cause the system to carry out the methods as explained herein.

The system and the controller, respectively, can be configured to perform particular operations or processes by virtue of software, firmware, hardware, or any combination thereof.

These and other features, aspects and advantages of the present invention will be further supported and described with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which refers to the appended figures, in which.

Single features depicted in the figures are shown relatively with regards to each other and therefore are not necessarily to scale. Similar or same elements in the figures, even if displayed in different embodiments, are typically represented with the same reference numbers.

DETAILED DESCRIPTION OF THE INVENTION

Figure 1:
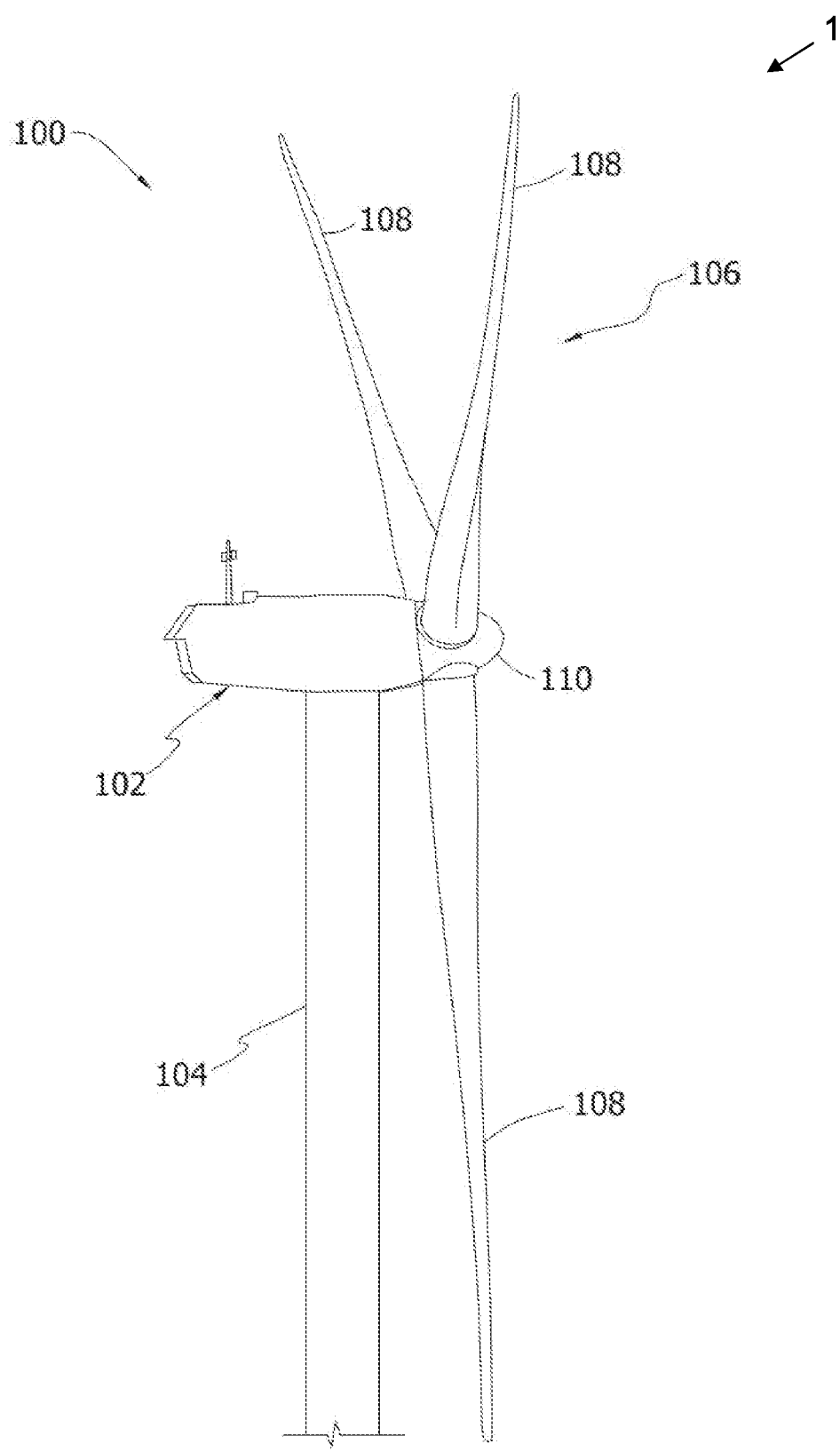
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 is a perspective view of a portion of an exemplary wind turbine 100. Wind turbine 100 includes a nacelle 102 housing a generator (not shown in FIG. 1). Nacelle 102 is mounted on a tower 104 (a portion of tower 104 being shown in FIG. 1). Tower 104 may have any suitable height that facilitates operation of wind turbine 100 as described herein. Wind turbine 100 also includes a rotor 106 that includes three blades 108 attached to a rotating hub 110. Alternatively, wind turbine 100 includes any number of blades 108 that facilitates operation of wind turbine 100 as described herein. In the exemplary embodiment, wind turbine 100 includes a gearbox (not shown in FIG. 1) operatively coupled to rotor 106 and a generator (not shown in FIG. 1).

Figure 2:
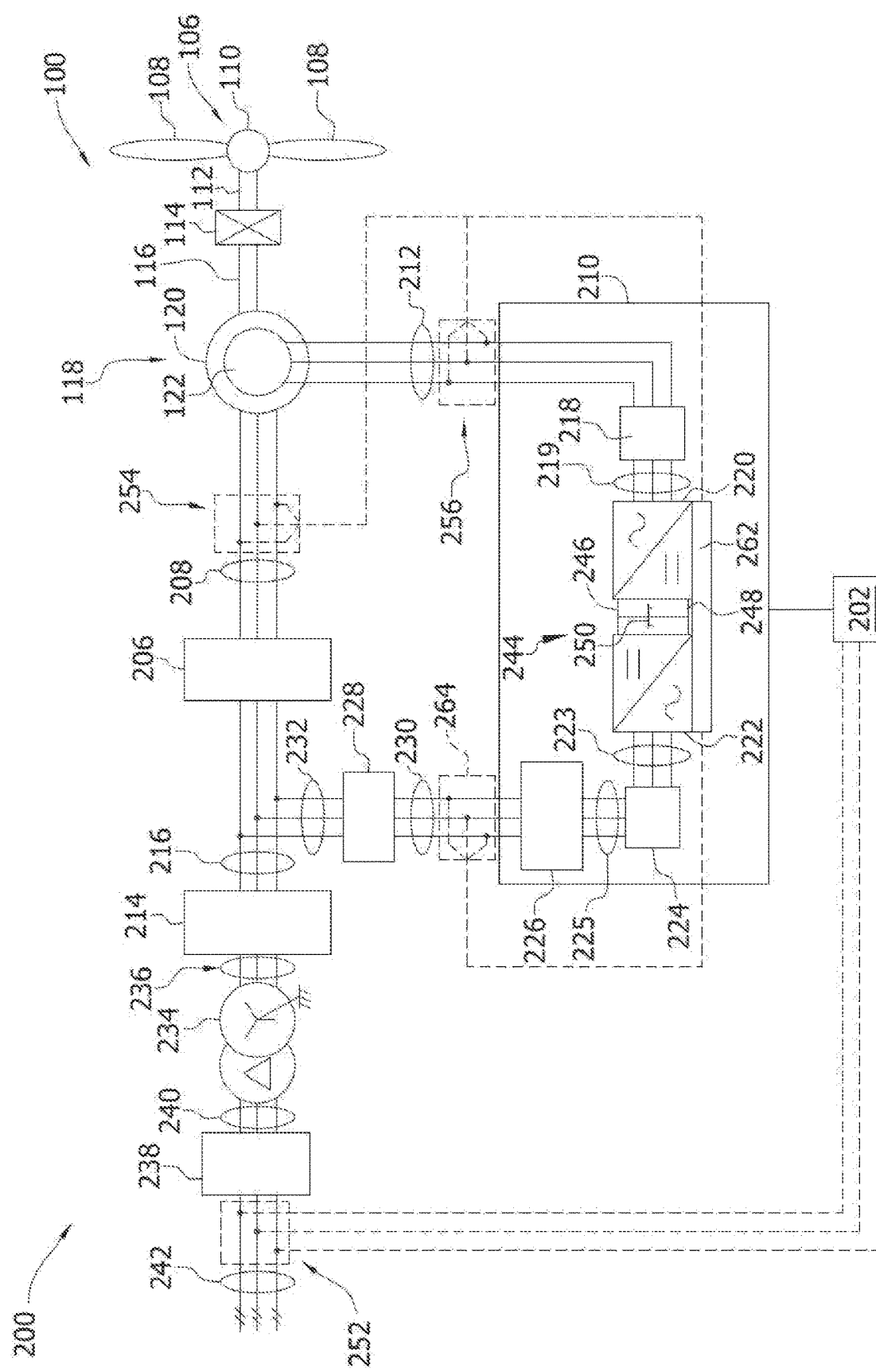
FIG. 2 illustrates a schematic view of one embodiment of an electrical power system and a control system suitable for use with the wind turbine shown in FIG. 1.

Referring now to FIG. 2, a schematic view of one embodiment of an electrical power system 200 that may be used with the wind turbine 100 is illustrated. During operation, wind impacts the blades 108 and the blades 108 transform wind energy into a mechanical rotational torque that rotatably drives a low-speed shaft 112 via the hub 110. The low-speed shaft 112 is configured to drive a gearbox 114 that subsequently steps up the low rotational speed of the low-speed shaft 112 to drive a high-speed shaft 116 at an increased rotational speed. The high-speed shaft 116 is generally rotatably coupled to a generator 118 so as to rotatably drive a generator rotor 122 having field winding (not shown).

More specifically, in one embodiment, the generator 118 may be a wound rotor, three-phase, doubly-fed induction (asynchronous) generator (DFIG) that includes a generator stator 120 magnetically coupled to a generator rotor 122. As such, a rotating magnetic field may be induced by the generator rotor 122 and a voltage may be induced within a generator stator 120 that is magnetically coupled to the generator rotor 122. In such embodiments, the generator 118 is configured to convert the rotational mechanical energy to a sinusoidal, three-phase alternating current (AC) electrical energy signal in the generator stator 120. The associated electrical power can be transmitted to a main transformer 234 via a stator bus 208, a stator synchronizing switch 206, a system bus 216, a main transformer circuit breaker 214, and a generator-side bus 236. The main transformer 234 steps up the voltage amplitude of the electrical power such that the transformed electrical power may be further transmitted to a grid via a grid circuit breaker 238, a breaker-side bus 240, and a grid bus 242.

In addition, the electrical power system 200 may include a wind turbine controller 202 configured to control any of the components of the wind turbine 100 and/or implement any of the method steps as described herein. For example, as shown particularly in FIG. 3, the controller 202 may include one or more processor(s) 204 and associated memory device(s) 207 configured to perform a variety of computer-implemented functions (e.g., performing the methods, steps, calculations and the like and storing relevant data as disclosed herein). Additionally, the controller 202 may also include a communications module to facilitate communications between the controller 202 and the various components of the wind turbine 100, e.g. any of the components of FIG. 2.

Figure 3:
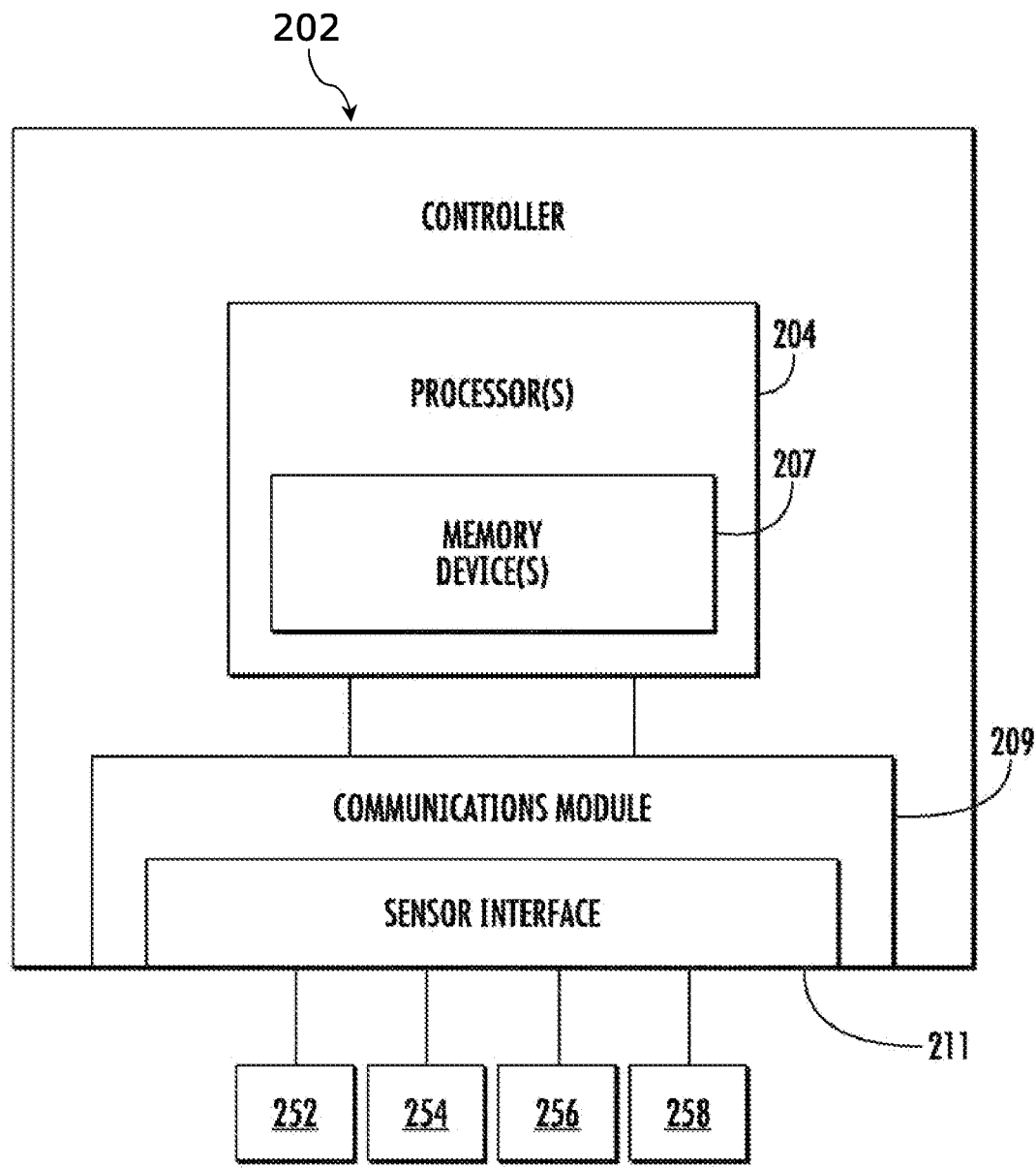
FIG. 3 illustrates a block diagram of one embodiment of a controller suitable for use with the wind turbine shown in FIG. 1.

Further, as shown in FIG. 3, the communications module 209 may include a sensor interface 211 (e.g., one or more analog-to-digital converters) to permit signals transmitted from one or more sensors to be converted into signals that can be understood and processed by the processors 204. It should be appreciated that the sensors (e.g. sensors 252, 254, 256, 258) may be communicatively coupled to the communications module 209 using any suitable means. For example, as shown in FIG. 3, the sensors 252, 254, 256, 258 may be coupled to the sensor interface 211 via a wired connection. However, in other embodiments, the sensors 252, 254, 256, 258 may be coupled to the sensor interface 211 via a wireless connection, such as by using any suitable wireless communications protocol known in the art. As such, the processor 204 may be configured to receive one or more signals from the sensors.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 204 is also configured to compute advanced control algorithms and communicate to a variety of Ethernet or serial-based protocols (Modbus, OPC, CAN, etc.). Additionally, the memory device(s) 207 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magnetooptical disk (MOD), a digital versatile disc (DVD) and/or other suitable memory elements. Such memory device(s) 207 may generally be configured to store suitable computer-readable instructions that, when implemented by the processor(s) 204, configure the controller 202 to perform the various functions as described herein.

Referring back to FIG. 2, the generator stator 120 may be electrically coupled to a stator synchronizing switch 206 via a stator bus 208. In an exemplary embodiment, to facilitate the DFIG configuration, generator rotor 122 is electrically coupled to a bi-directional power conversion assembly 210 via a rotor bus 212. Alternatively, generator rotor 122 is electrically coupled to rotor bus 212 via any other device that facilitates operation of electrical and control system 200 as described herein. As a further alternative, electrical and control system 200 is configured as a full power conversion system (not shown) that includes a full power conversion assembly (not shown in FIG. 2) similar in design and operation to power conversion assembly 210 and electrically coupled to generator stator 120. The full power conversion assembly facilitates channeling electric power between generator stator 120 and an electric power transmission and distribution grid (not shown). In the exemplary embodiment, stator bus 208 transmits three-phase power from generator stator 120 to stator synchronizing switch 206. Rotor bus 212 transmits three-phase power from generator rotor 122 to power conversion assembly 210. In the exemplary embodiment, stator synchronizing switch 206 is electrically coupled to a main transformer circuit breaker 214 via a system bus 216. In an alternative embodiment, one or more fuses (not shown) are used instead of main transformer circuit breaker 214. In another embodiment, neither fuses nor main transformer circuit breaker 214 is used.

Power conversion assembly 210 includes a rotor filter 218 that is electrically coupled to generator rotor 122 via rotor bus 212. A rotor filter bus 219 electrically couples rotor filter 218 to a rotor-side power converter 220, and rotor-side power converter 220 is electrically coupled to a line-side power converter 222. Rotor-side power converter 220 and line-side power converter 222 are power converter bridges including power semiconductors (not shown). In the exemplary embodiment, rotor-side power converter 220 and line-side power converter 222 are configured in a three-phase, pulse width modulation (PWM) configuration including insulated gate bipolar transistor (IGBT) switching devices (not shown in FIG. 2) that operate as known in the art. Alternatively, rotor-side power converter 220 and line-side power converter 222 have any configuration using any switching devices that facilitate operation of electrical and control system 200 as described herein. Power conversion assembly 210 is coupled in electronic data communication with turbine controller 202 to control the operation of rotor-side power converter 220 and line-side power converter 222.

In the exemplary embodiment, a line-side power converter bus 223 electrically couples line-side power converter 222 to a line filter 224. Also, a line bus 225 electrically couples line filter 224 to a line contactor 226. Moreover, line contactor 226 is electrically coupled to a conversion circuit breaker 228 via a conversion circuit breaker bus 230. In addition, conversion circuit breaker 228 is electrically coupled to main transformer circuit breaker 214 via system bus 216 and a connection bus 232. Alternatively, line filter 224 is electrically coupled to system bus 216 directly via connection bus 232 and includes any suitable protection scheme (not shown) configured to account for removal of line contactor 226 and conversion circuit breaker 228 from electrical and control system 200. Main transformer circuit breaker 214 is electrically coupled to an electric power main transformer 234 via a generator-side bus 236. Main transformer 234 is electrically coupled to a grid circuit breaker 238 via a breaker-side bus 240. Grid circuit breaker 238 is connected to the electric power transmission and distribution grid via a grid bus 242. In an alternative embodiment, main transformer 234 is electrically coupled to one or more fuses (not shown), rather than to grid circuit breaker 238, via breaker-side bus 240. In another embodiment, neither fuses nor grid circuit breaker 238 is used, but rather main transformer 234 is coupled to the electric power transmission and distribution grid via breaker-side bus 240 and grid bus 242.

In the exemplary embodiment, rotor-side power converter 220 is coupled in electrical communication with line-side power converter 222 via a single direct current (DC) link 244. Alternatively, rotor-side power converter 220 and line-side power converter 222 are electrically coupled via individual and separate DC links (not shown in FIG. 2). DC link 244 includes a positive rail 246, a negative rail 248, and at least one capacitor 250 coupled between positive rail 246 and negative rail 248. Alternatively, capacitor 250 includes one or more capacitors configured in series and/or in parallel between positive rail 246 and negative rail 248.

Turbine controller 202 is configured to receive a plurality of voltage and electric current measurement signals from a first set of voltage and electric current sensors 252. Moreover, turbine controller 202 is configured to monitor and control at least some of the operational variables associated with wind turbine 100. In the exemplary embodiment, each of three voltage and electric current sensors 252 are electrically coupled to each one of the three phases of grid bus 242. Accordingly, a current frequency of the grid may be determined by controller 202. Alternatively or in addition, turbine controller 202 may be functionally coupled with a frequency sensor connectable with the grid. Further, it is possible that controller 202 receives the current frequency of the grid or at least a signal representative for the current frequency of the grid via primary plant controller such as a wind farm controller functionally coupled with a respective sensor.

As shown in FIG. 2, electrical and control system 200 also includes a converter controller 262 that is configured to receive a plurality of voltage and electric current measurement signals. For example, in one embodiment, converter controller 262 receives voltage and electric current measurement signals from a second set of voltage and electric current sensors 254 coupled in electronic data communication with stator bus 208. Converter controller 262 receives a third set of voltage and electric current measurement signals from a third set of voltage and electric current sensors 256 coupled in electronic data communication with rotor bus 212. Converter controller 262 also receives a fourth set of voltage and electric current measurement signals from a fourth set of voltage and electric current sensors 264 coupled in electronic data communication with conversion circuit breaker bus 230. Second set of voltage and electric current sensors 254 is substantially similar to first set of voltage and electric current sensors 252, and fourth set of voltage and electric current sensors 264 is substantially similar to third set of voltage and electric current sensors 256. Converter controller 262 is substantially similar to turbine controller 202 and is coupled in electronic data communication with turbine controller 202. Moreover, in the exemplary embodiment, converter controller 262 is physically integrated within power conversion assembly 210. Alternatively, converter controller 262 has any configuration that facilitates operation of electrical and control system 200 as described herein.

During operation, wind impacts blades 108 and blades 108 transform wind energy into a mechanical rotational torque that rotatably drives low-speed shaft 112 via hub 110. Low-speed shaft 112 drives gearbox 114 that subsequently steps up the low rotational speed of low-speed shaft 112 to drive high-speed shaft 116 at an increased rotational speed. High speed shaft 116 rotatably drives generator rotor 122. A rotating magnetic field is induced by generator rotor 122 and a voltage is induced within generator stator 120 that is magnetically coupled to generator rotor 122. Generator 118 converts the rotational mechanical energy to a sinusoidal, three-phase alternating current (AC) electrical energy signal in generator stator 120. In the exemplary embodiment, the associated electrical power is transmitted to main transformer 234 via stator bus 208, stator synchronizing switch 206, system bus 216, main transformer circuit breaker 214 and generator-side bus 236. Main transformer 234 steps up the voltage amplitude of the electrical power and the transformed electrical power is further transmitted to a grid via breaker-side bus 240, grid circuit breaker 238 and grid bus 242.

In the exemplary embodiment, a second electrical power transmission path is provided. Electrical, three-phase, sinusoidal, AC power is generated within generator rotor 122 and is transmitted to power conversion assembly 210 via rotor bus 212. Within power conversion assembly 210, the electrical power is transmitted to rotor filter 218 and the electrical power is modified for the rate of change of the PWM signals associated with rotor-side power converter 220. Rotor-side power converter 220 acts as a rectifier and rectifies the sinusoidal, three-phase AC power to DC power. The DC power is transmitted into DC link 244. Capacitor 250 facilitates mitigating DC link 244 voltage amplitude variations by facilitating mitigation of a DC ripple associated with AC rectification.

The DC power is subsequently transmitted from DC link 244 to line-side power converter 222 and line-side power converter 222 acts as an inverter configured to convert the DC electrical power from DC link 244 to three-phase, sinusoidal AC electrical power with pre-determined voltages, currents, and frequencies. This conversion is monitored and controlled via converter controller 262. The converted AC power is transmitted from line-side power converter 222 to system bus 216 via line-side power converter bus 223 and line bus 225, line contactor 226, conversion circuit breaker bus 230, conversion circuit breaker 228, and connection bus 232. Line filter 224 compensates or adjusts for harmonic currents in the electric power transmitted from line-side power converter 222. Stator synchronizing switch 206 is configured to close to facilitate connecting the three-phase power from generator stator 120 with the three-phase power from power conversion assembly 210.

Conversion circuit breaker 228, main transformer circuit breaker 214, and grid circuit breaker 238 are configured to disconnect corresponding buses, for example, when excessive current flow may damage the components of electrical and control system 200. Additional protection components are also provided including line contactor 226, which may be controlled to form a disconnect by opening a switch (not shown in FIG. 2) corresponding to each line of line bus 225.

Power conversion assembly 210 compensates or adjusts the frequency of the three-phase power from generator rotor 122 for changes, for example, in the wind speed at hub 110 and blades 108. Therefore, in this manner, mechanical and electrical rotor frequencies are decoupled from stator frequency.

Under some conditions, the bi-directional characteristics of power conversion assembly 210, and specifically, the bi-directional characteristics of rotor-side power converter 220 and line-side power converter 222, facilitate feeding back at least some of the generated electrical power into generator rotor 122. More specifically, electrical power is transmitted from system bus 216 to connection bus 232 and subsequently through conversion circuit breaker 228 and conversion circuit breaker bus 230 into power conversion assembly 210. Within power conversion assembly 210, the electrical power is transmitted through line contactor 226, line bus 225, and line-side power converter bus 223 into line-side power converter 222. Line-side power converter 222 acts as a rectifier and rectifies the sinusoidal, three-phase AC power to DC power. The DC power is transmitted into DC link 244. Capacitor 250 facilitates mitigating DC link 244 voltage amplitude variations by facilitating mitigation of a DC ripple sometimes associated with three-phase AC rectification.

The DC power is subsequently transmitted from DC link 244 to rotor-side power converter 220 and rotor-side power converter 220 acts as an inverter configured to convert the DC electrical power transmitted from DC link 244 to a three-phase, sinusoidal AC electrical power with pre-determined voltages, currents, and frequencies. This conversion is monitored and controlled via converter controller 262. The converted AC power is transmitted from rotor-side power converter 220 to rotor filter 218 via rotor filter bus 219 and is subsequently transmitted to generator rotor 122 via rotor bus 212, thereby facilitating sub-synchronous operation.

Power conversion assembly 210 is configured to receive control signals from turbine controller 202. The control signals are based on sensed conditions or operating characteristics of wind turbine 100 and electrical and control system 200. The control signals are received by turbine controller 202 and used to control operation of power conversion assembly 210. Feedback from one or more sensors may be used by electrical and control system 200 to control power conversion assembly 210 via converter controller 262 including, for example, conversion circuit breaker bus 230, stator bus and rotor bus voltages or current feedbacks via second set of voltage and electric current sensors 254, third set of voltage and electric current sensors 256, and fourth set of voltage and electric current sensors 264. Using this feedback information, and for example, switching control signals, stator synchronizing switch control signals and system circuit breaker control (trip) signals may be generated in any known manner. For example, for a grid voltage transient with predetermined characteristics, converter controller 262 will at least temporarily substantially suspend the IGBTs from conducting within line-side power converter 222. Such suspension of operation of line-side power converter 222 will substantially mitigate electric power being channeled through power conversion assembly 210 to approximately zero.

In the exemplary embodiment, generator 118, step-up transformer 234 and power conversion assembly 210 electrically coupled to generator 118 and transformer 234 form the power conversion system of wind turbine 100.

Figure 4:
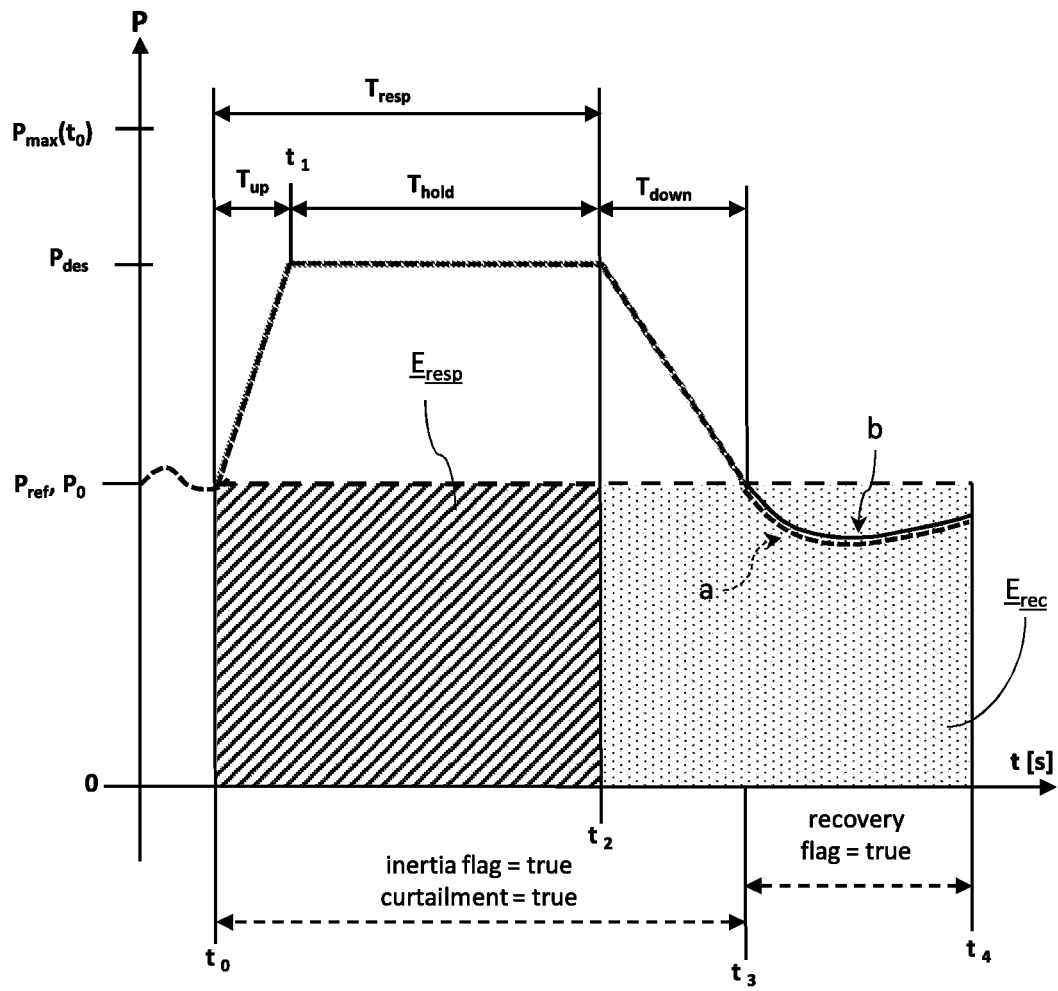
FIG. 4 illustrates a power course as function of time during operating a wind turbine according to embodiments of the present disclosure.

FIG. 4 illustrates an exemplary schematic course of an electrical output power P of a power conversion system of a wind turbine as explained above with regard to FIG. 1 to FIG. 3.

At a first time $t_0$, typically at time of detecting an underfrequency event of the utility grid the wind turbine is feeding power to or shortly thereafter, the wind turbine is set an overproduction operating mode.

This may be triggered by receiving a respective command from a power conversion plant controller and setting an inertia flag to true (or 1), respectively.

In the overproduction operating mode, the electrical output power P(t) of the wind turbine's power conversion system is increased from an initial electrical output power $P_0$ at $t_0$ to a desired higher power value $P_{des}$, but typically below a possible maximum electrical power output $P_{max} > P_{des}$ at $t_0$.

In the exemplary embodiment, the electrical output power P(t) is ramped up linearly within an uptime $T_{up}$ (that may be specified by the grid code) up to $P_{des}$.

After reaching the desired higher power value $P_{des}$ at a later time $t_1 = t_0 + T_{up}$, the electrical output power P(t) is held at least substantially constant for a holding time $T_{hold}$ and/or until a response time interval $T_{resp} = T_{up} + T_{hold}$ is reached at a second time $t_2$. $T_{resp}$, $T_{up}$, and/or $T_{hold}$, may also be specified by the grid code.

Beginning at the second time $t_2$ (or shortly thereafter), the electrical output power P(t) is, in the exemplary embodiment linearly decreased (ramped-down), and, at the very same time, time integrating a reference power $P_{ref}$ is started to calculate an energy recovery value $E_{rec}$. The reference power $P_{ref}$ is typically related to the initial electrical output power $P_0$ and may even correspond to $P_0$ as indicated in FIG. 4.

Further, an energy response value $E_{resp}$ may be determined by multiplying $P_{ref}$ with the time difference $T_{resp}$ between the second time $t_2$ and the first time $t_0$: $E_{resp} = P_{ref} * T_{res}$.

Beginning at the second time $t_2$ (or shortly thereafter), the electrical output power P(t) may be ramped down with a given rate and/or for a given down time $T_{down}$, one or both of which may be specified by the grid code.

At a third time $t_3$, the electrical output power P(t) reaches (or crosses) the reference power $P_{ref}$, e.g. the initial electrical output power $P_0$.

At the third time $t_3$, the wind turbine is set in a recovery operating mode, for example in response to receiving a respective command from a power conversion plant controller and setting a recovery flag to true (or 1), respectively.

Note that, the times $t_1$ to $t_3$ may be determined by the power conversion plant controller to operate all wind turbines of the power conversion plant (at least substantially, i.e. within real-time or near real-time accuracy) synchronously from $t_1$ to $t_3$. The subsequent recovery operating mode may be controlled by the (wind) turbine controller(s).

In the recovery operating mode, the electrical output power P(t) of the wind turbine(s) is limited upwards as indicated by curve b in FIG. 4. Curve a in FIG. 4 corresponds to an exemplary actual output power P(t) of a wind turbine.

The electrical output power P(t) is, in the exemplary embodiment, limited as function of the initial electrical output power $P_0$ and a currently available maximum electrical power output $P_{max}(t)$ without (further) reducing a speed of the wind turbine's rotor. This is typically done by the wind turbine controller.

Note that the currently available maximum electrical power output $P_{max}(t)$ is typically different to the available maximum electrical power output $P_{max}(t_0)$ at $t_0$. It may be lower, at least initially, but may also become higher if wind speed increases.

The wind turbine is operated in the recovery operating until at least one of the following conditions is met: the energy recovery value $E_{rec}$ determined by integrating becomes at least equal to the energy response value $E_{resp}$, and the electrical output power P(t) reaches or crosses the initial electrical output power $P_0$ again from below. The latter is illustrated in FIG. 4.

In the recovery operating mode, the actual electrical output power (curve b) is limited upwards by $P_b(t)$ as shown in curve b. $P_b(t)$ may in particular be determined as the minimum function of the reference power $P_{ref}$, i.e. the initial electrical output power $P_0$ at $t_0$ in the exemplary embodiment, and the currently available maximum electrical power output $P_{max}(t)$ times a power factor $p_f$:

$$P_b(t)=\text{Min}(P_{ref}, p_f * P_{max}(t))=\text{Min}(P_0, p_f * P_{max}(t))$$

The currently available maximum electrical power output $P_{max}(t)$ may be determined from the (measured) rotor speed n or generator rotor speed and the rated torque $T_r$, for example as $$P_{max}(t)=n(t)*T_r.$$

The power factor $p_f$ is larger than zero and typically below one, for example close to one.

Accordingly, the actual power output power as shown in curve a may be kept close but below the limiting curve b ($P_b(t)$).

Thus, good grid code compliance for fast frequency response mode (in a low frequency event of the grid) can be ensured using a particularly easy, easy adaptable and reliable control mechanism. This was confirmed by not presented simulations for a wide range of parameters.

Note that the actual power output power as shown in curve a of FIG. 4 may also below the limiting curve b ($P_b(t)$) if the power factor is one. This may be due to other constrains to be take into account for controlling the wind turbine.

Note further that the gird code for a fast frequency response typically requires different power recovery requirements for different countries.

For example, the energy provided is required to be equal to or larger than energy loss, the power drop may be required to be at most 20% or at most 10% of a rated or an actual power, and/or power recovery may be required to be achieved within e.g. 180 seconds.

In the exemplary embodiment, the recovery mode ends (and the recovery flag is reset) when the energy recovery value $E_{rec}$ becomes at least equal to the energy response value $E_{resp}$. Thereafter, the wind turbine is typically (again) operated in normal operating mode, i.e. without limiting the output power upwards in accordance with the reference power/initial electrical output power and the actual available maximum electrical power output Pmax(t) that does not result in reducing the rotor speed.

If the wind turbine or at least one wind turbines of a power plant is running out of available power or energy prior to the second time $t_2$, the power plant controller typically resets the inertia flag and curtailment command for the at least one (individual) wind turbine only, and initiates the power recovery mode by sending the recovery flag for that wind turbine only, which in turn starts operating in the recovery mode. The other wind turbines of the power plant may be requested by the power plant controller to use their available power to compensate the "loss" of wind turbine already operating in the recovery mode to deliver the required inertia power response over the (desired) complete response time (interval) $T_{resp}$.

In this embodiment, the wind turbines may be operated synchronously until the at least one wind turbines of the power plant is running out of available power or energy.

Figure 5A:
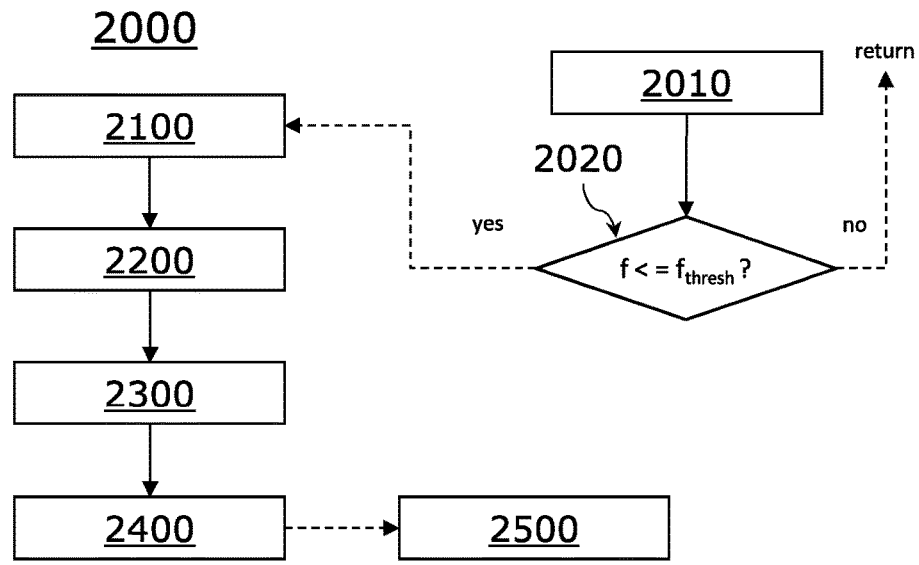
FIG. 5A illustrates a flow diagram of a method for operating a wind turbine according to an embodiment of the present disclosure.

FIG. 5A illustrates a flow diagram of a method 2000 for operating a wind turbine as explained above with regard to FIG. 1 to FIG. 3.

In a block 2100, a wind turbine, typically a plurality of wind turbines is set to operate in an overproduction operating mode in which the electrical output power of the wind turbine's power conversion system is increased from an initial electrical output power of the power conversion system using kinetic energy stored in the rotor and optionally the power conversion system.

As indicated by the right part of FIG. 5A, block 2100 is typically entered after determining, in a decision block 202, that a frequency f of the grid as measured in a block 2010 is at or below a threshold frequency $f_{thresh}$, in particular a deadband frequency of the (utility) grid the wind turbine(s) is/are connected to for feeding the output power into the grid.

The wind turbine(s) is/are typically operated in the overproduction operating mode as explained above with regard to FIG. 4.

After a given response time of operating the wind turbine (s) in the overproduction operating mode, both an electrical output power decrease (typically from a power plateau) and integrating a reference power (which is typically related to or even represented by the initial electrical output power when entering the overproduction operating mode) to determine an energy recovery value is initiated, in a block 2300.

The electrical output power is typically decreased at least substantially linearly.

When the decreasing electrical output power reaches or crosses the reference power from above, the wind turbines are set to operate in a recovery operating mode in a block 2400.

In the recovery operating mode, the wind turbine's electrical output power is limited to values at or below a function of the reference power and a time dependent currently available maximum electrical power output ensuring that the rotor speed is not further decreased, in particular a minimum function of the currently available maximum electrical power output times a power factor, and the reference power.

When the energy recovery value becomes at least equal to the energy response value or when the electrical output power reaches and/or crosses the reference power from below, the wind turbine(s) may be set to switch back to normal operating mode, in a block 2500.

Figure 5B:
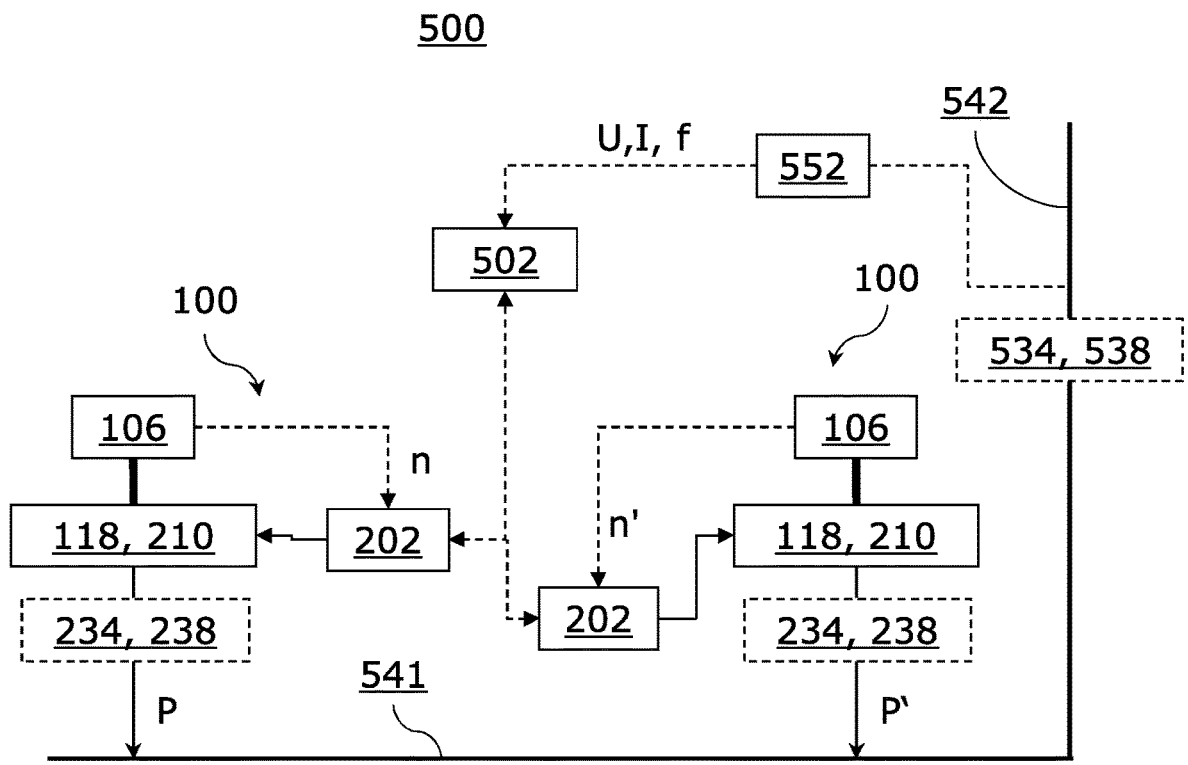
FIG. 5B illustrates a block diagram of a power plant according to an embodiment of the present disclosure.

FIG. 5B is a block diagram of an exemplary power plant 500 connectable to a utility grid 542 via a grid circuit breaker 538.

In the exemplary embodiment, only two of typically a plurality of wind turbines 100 which are typically at least similar as explained above with regard to FIG. 1 to FIG. 3 are shown.

Power plant 500 may in particular be a wind farm.

In the exemplary embodiment, power plant 500 comprises an optional plant power transformer 534 for stepping up the voltage from an internal grid voltage level of an internal (power plant) grid 541 of, for example, a medium voltage in a voltage range from typically 6 kV to 50 kV to a higher utility grid voltage level.

Each wind turbine 100 has a rotor 100 and a power conversion system 210 including a generator 118 mechanically connected with the rotor 106.

Further, each of the illustrated wind turbines 100 has, in the exemplary embodiment, an optional transformer 223 for stepping up the voltage to the internal grid voltage level, and is connectable to the internal grid via a respective circuit breaker 238.

Each wind turbine 100 has a respective wind turbine controller 202 supervised by a power plant controller 502.

The wind turbine controllers 202 are communicatively coupled with the respective power conversion assembly 210 for controlling the output power P, P'. Further, the wind turbine controllers 202 may be communicatively coupled with the corresponding rotor 106 and a rotational speed sensor thereof, respectively, for receiving a respective rotor speed signal n, n'.

In the exemplary embodiment, the power plant controller 502 is communicatively coupled with a sensor or a sensor unit 552 which is connectable to the utility grid 542 and configured, in a connected state, to measure one or more signals which are correlated with a current frequency f of utility grid 542 such as voltage(s) U and current(s) I (of one or more phases), and/or even to measure and/or determine the current frequency f.

Power plant controller 502 and the wind turbine controllers 202 (including a respective optional converter controller for directly controlling a converter as e.g. explained above with respect to FIG. 2) form the control system of power plant 500.

Control system 502, 202 may perform any of the methods explained above with regard to FIGS. 4, 5A.

In particular, control system 502, 202 may be configured to operate the wind turbines 100 in an overproduction operating mode in which the electrical output power P, P' of the power conversion systems 118, 210, 238 is increased from an initial electrical output power when entering the overproduction operating mode by using kinetic energy stored in the wind turbine; to start, when a predetermined time interval or period ($T_{resp}$) of operating in the overproduction operating mode has come to an end, both integrating the reference power to determine an energy recovery value, and decreasing the electrical output power P, P'; to calculate an energy response value as a product of a reference power and the predetermined time interval or period; and to operate, when the electrical output power P, P' reaches and/or crosses the reference power from above, the respective wind turbine 100 in a recovery operating mode until the energy recovery value becomes at least equal to the energy response value or until the electrical output power P, P' reaches and/or crosses the reference power again from below. The electrical output power P, P' is, in the recovery operating mode, limited upwards depending on the reference power and a respective currently available maximum electrical power output of the respective wind turbine which is achievable without reducing its rotor speed.

According to an embodiment, a method for operating a wind turbine includes initializing, at a first time, the wind turbine to operate in an overproduction operating mode in which the electrical output power of the wind turbine is increased from an initial electrical output power by providing kinetic energy stored in the wind turbine, in particular the rotor. At a second time, the electrical output power of the wind turbine starts to decrease. An energy response value typically corresponding to a product of a reference power and a time difference between the second time and the first time is determined. The wind turbine is operated in a recovery operating mode from a third time at which the electrical output power reaches or crosses the reference power until the energy recovery value becomes at least equal to an energy response value or until the electrical output power reaches or crosses the reference power again from below. In the recovery operating mode, the electrical output power is, limited upwards depending on the reference power and a currently available maximum electrical power output without reducing a speed of the rotor. Typically, the energy recovery value is determined by integrating the reference power, wherein integrating the reference power starts at the second time.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. For example, while the written description refers to horizontal axis wind turbines, the embodiments may also refer to vertical axis wind turbines, in particular variable pitch vertical axis wind turbines. Accordingly, operating the rotor to move around a predefined desired angular orientation with respect to the axis of rotation of the rotor in an alternating fashion while the generator is not in a power operating mode may both applied to horizontal axis wind turbines and vertical axis wind turbines. Such other examples are intended to be within the scope of the claims if they include elements that do not differ from the literal language of the claims, or if they include equivalent structural elements with insubstantial differences from the literal languages of the claims.

The present invention is not limited to the above-described embodiments and modifications and may be embodied in various forms within the gist thereof, for example, the technical features of the embodiments referring to operating a wind turbine may be combined with the embodiments referring to designing a wind turbine may be combined, i.e. operating a wind turbine as explained herein may refer to operating a wind turbine designed as explained herein. Further, modifications corresponding to the technical features according to the aspects described in the Summary of the Invention section may be replaced or combined as appropriate to solve some or all of the above-described problems or obtain some or all of the above-described effects. The technical features may also be omitted as appropriate unless they are described as being essential in this specification.

REFERENCE NUMBERS wind turbine 100
nacelle 102 tower 104
rotor 106
blades 108
hub 110
low speed shaft 112
gearbox 114
generator 118
generator stator 120
generator rotor 122
control system 200
turbine controller 202
processor 204
synchronizing switch 206
memory 207
stator bus 208
communications module 209
power conversion assembly 210
sensor interface 211
rotor bus 212
transformer circuit breaker 214
system bus 216
rotor filter 218
filter bus 219
rotor-side power converter 220
line side power converter 222
line side power converter bus 223
line filter 224
line bus 225
line contactor 226
conversion circuit breaker 228
conversion circuit breaker bus 230
connection bus 232
electric power main transformer 234, 534
generator-side bus 236
grid circuit breaker 238, 538
breaker-side bus 240
distribution grid via a grid bus 242
DC link 244
positive rail 246
negative rail 248
capacitor 250
electric current sensors 252
electric current sensors 254
electric current sensors 256
converter controller 262
electric current sensors 264

The invention claimed is:

1. A method for operating a wind turbine having a rotor with rotor blades and a power conversion system mechanically connected with the rotor that is configured to convert input motive power into electrical output power (P), the power conversion system electrically connected to a network to feed the electrical output power (P) to the network, the method comprising:
at a first time ($t_0$), initializing the wind turbine to operate in an overproduction mode in which the electrical output power (P) of the power conversion system is increased from an initial electrical output power ($P_0$), wherein kinetic energy stored in the rotor is used in the overproduction mode;
at a second time ($t_2=t_0+T_{resp}$), start decreasing the electrical output power (P), and start integrating a reference power ($P_{ref}$) to determine an energy recovery value ($E_{rec}$);
determining an energy response value ($E_{resp}$) corresponding to a product of the reference power ($P_{ref}$) with a time difference ($T_{resp}$) between the second time ($t_2$) and the first time ($t_0$); and
operating the wind turbine (100) in a recovery operating mode from a third time ($t_3$) at which the electrical output power (P) reaches or crosses the reference power ($P_{ref}$, $P_0$) until the energy recovery value ($E_{rec}$) becomes at least equal to the energy response value ($E_{resp}$) or until the electrical output power (P) reaches or crosses the reference power ($P_{ref}$) again from below, wherein the electrical output power (P) is, in the recovery operating mode, limited upwards depending on the reference power ($P_{ref}$) and a currently available maximum electrical power output ($P_{max}(t)$) without reducing a speed of the rotor.

2. The method of claim 1, wherein:
the reference power ($P_{ref}$) is related to the initial electrical output power ($P_0$); or
the electrical output power (P) is, in the recovery operating mode, limited or determined as a function of the reference power ($P_{ref}$), a currently available maximum electrical power output ($P_{max}(t)$), and a power factor ($p_f$).

3. The method of claim 2, wherein the function is given by the minimum of the reference power ($P_{ref}$) and the currently available maximum electrical power output output ($P_{max}(t)$) times the power factor ($p_f$).

4. The method of claim 2, wherein the power factor ($p_f$) is greater than zero and at most equal to 1.

5. The method of claim 2, further comprising using a rotor speed to determine the currently available maximum electrical power output ($P_{max}(t)$).

6. The method of claim 1, wherein integrating the reference power ($P_{ref}$) comprises summing up the reference power ($P_{ref}$, $P_0$) times a cycle time.

7. The method of claim 1, wherein a rotational energy stored in a moment of inertia of the rotor or in a generator rotor of a generator of the power conversion system is used in the overproduction mode.

8. The method of claim 1, further comprising at least one of:
prior to the initializing step, determining a current frequency (f) of the network;
starting the initializing step when the current frequency (f) is equal to or lower than a threshold frequency ($f_{thresh}$); and
operating the wind turbine in a normal operating mode when the electrical output power (P) reaches or crosses the reference power ($P_{ref}$) again from below.

9. The method of claim 1, wherein operating the wind turbine in the overproduction mode comprises operating the power conversion system in accordance with a piecewise linear function of time.

10. A power conversion plant connectable to a network, comprising:
a wind turbine comprising a rotor and a power conversion system mechanically connected with the rotor and electrically connectable to the network, the power conversion system configured to convert input motive power into electrical output power (P);
a control system communicatively couple with the power conversion system and configured to:
operate the wind turbine between a first time ($t_0$) and a second time ($t_2$) in an overproduction mode in which the electrical output power (P) is increased from an initial electrical output power ($P_0$) at the first time ($t_0$), wherein kinetic energy stored in the rotor is used in the overproduction mode;

determine an energy response value ($E_{resp}$) corresponding to a product of a reference power ($P_{ref}$) with a time difference ($T_{resp}$) between the second time ($t_2$) and the first time ($t_0$);

start, at the second time ($t_2$), integrating the reference power ($P_{ref}$) to determine an energy recovery value ($E_{rec}$), and decreasing the electrical output power (P); and when the electrical output power (P) reaches or crosses the reference power ($P_{ref}$), operate the wind turbine in a recovery operating mode until the energy recovery value ($E_{rec}$) becomes at least equal to the energy response value ($E_{rec}$) or until the electrical output power (P) reaches or crosses the reference power ($P_{ref}$) again from below, wherein the electrical output power (P) is, in the recovery operating mode, limited upwards depending on the reference power ($P_{ref}$) and a currently available maximum electrical power output ($P_{max}(t)$) without reducing a speed of the rotor.

11. The power conversion plant of claim 10, further comprising a sensor communicatively coupled with the control system and connectable to the network to measure at least one signal correlated with a current frequency (f) of the network; and wherein the control system is further configured to initialize operating the wind turbine in the overproduction mode when the current frequency (f) is equal to or lower than a threshold frequency ($f_{thresh}$).

12. The power conversion plant of claim 10, wherein the power conversion plant is a wind farm that comprises at least two wind turbines, wherein each of the wind turbines comprises a respective wind turbine controller, wherein the control system comprises a supervisory controller configured as a wind farm controller communicatively coupled with the wind turbine controllers and configured to instruct the wind turbine controllers to operate the respective wind turbine in the overproduction operating mode, to determine the energy response value ($E_{resp}$), to determine the energy recovery value ($E_{rec}$), and to compare the energy response value ($E_{resp}$) and the energy recovery value ($E_{rec}$).

13. The power conversion plant of claim 12, wherein the supervisory controller is configured to instruct the wind turbine controllers to do one or more of:

operate the respective wind turbine in the overproduction operating mode substantially synchronously;

in the recovery mode, determine or monitor the currently available maximum electrical power output ($P_{max}(t)$) for the respective wind turbines; and operate the respective wind turbine depending on the respective currently available maximum electrical power output ($P_{max}(t)$).

14. The power conversion plant claim 10, wherein the control system is configured to control the respective power conversion system so that a power increase (PI) between the first time and the second time is provided using rotational energy stored in a moment of inertia of the rotor or in a generator rotor of a generator of the respective power conversion system.

15. A non-transitory computer-readable medium comprising instructions executable by a control system of a power conversion plant to cause the system to carry out the steps of the method according to claim 1.

* * * * *